July 24, 1956 G. E. DUNN ET AL 2,755,543
METHOD OF MAKING UNIVERSAL JOINT BODIES
Original Filed Sept. 25, 1952 5 Sheets-Sheet 1
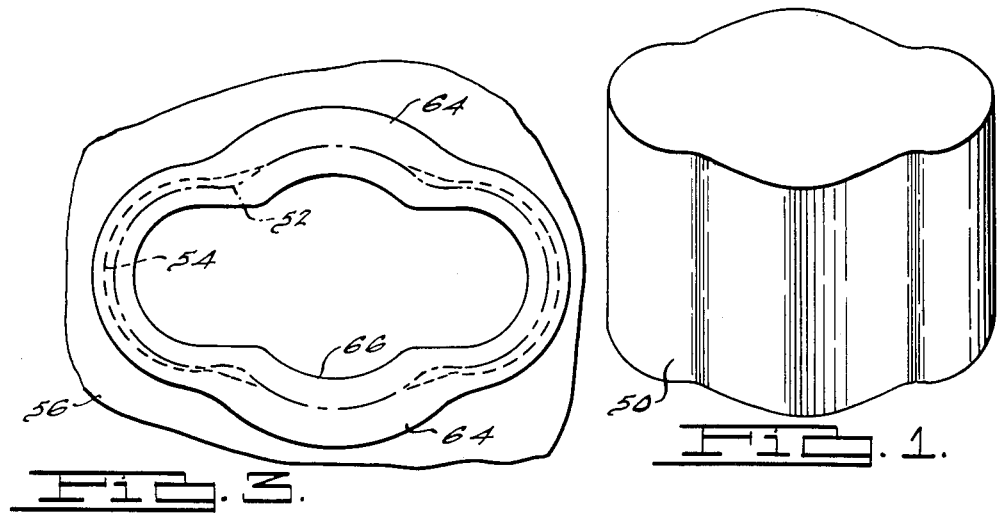
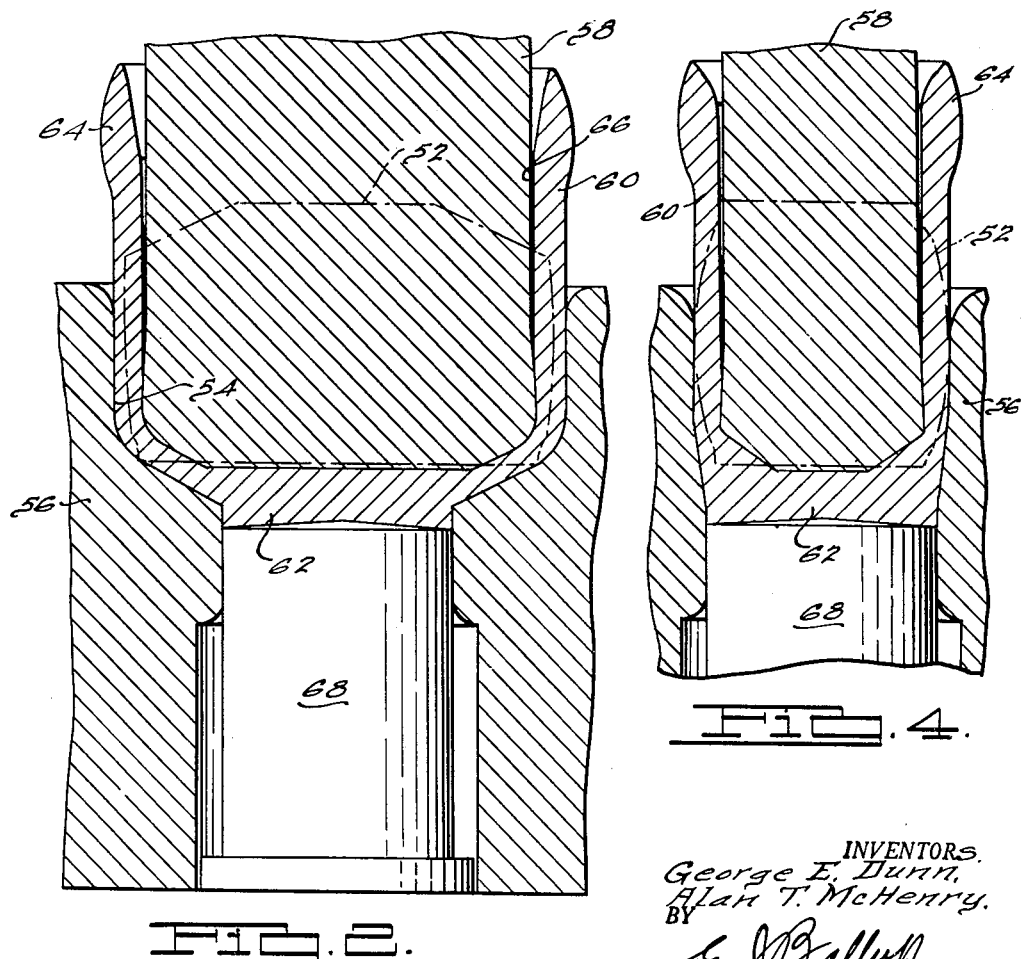
INVENTORS.
George E. Dunn,
Alan T. McHenry.
BY
E. J. Balluff
ATTORNEY.

July 24, 1956 G. E. DUNN ET AL 2,755,543
METHOD OF MAKING UNIVERSAL JOINT BODIES
Original Filed Sept. 25, 1952 5 Sheets-Sheet 2
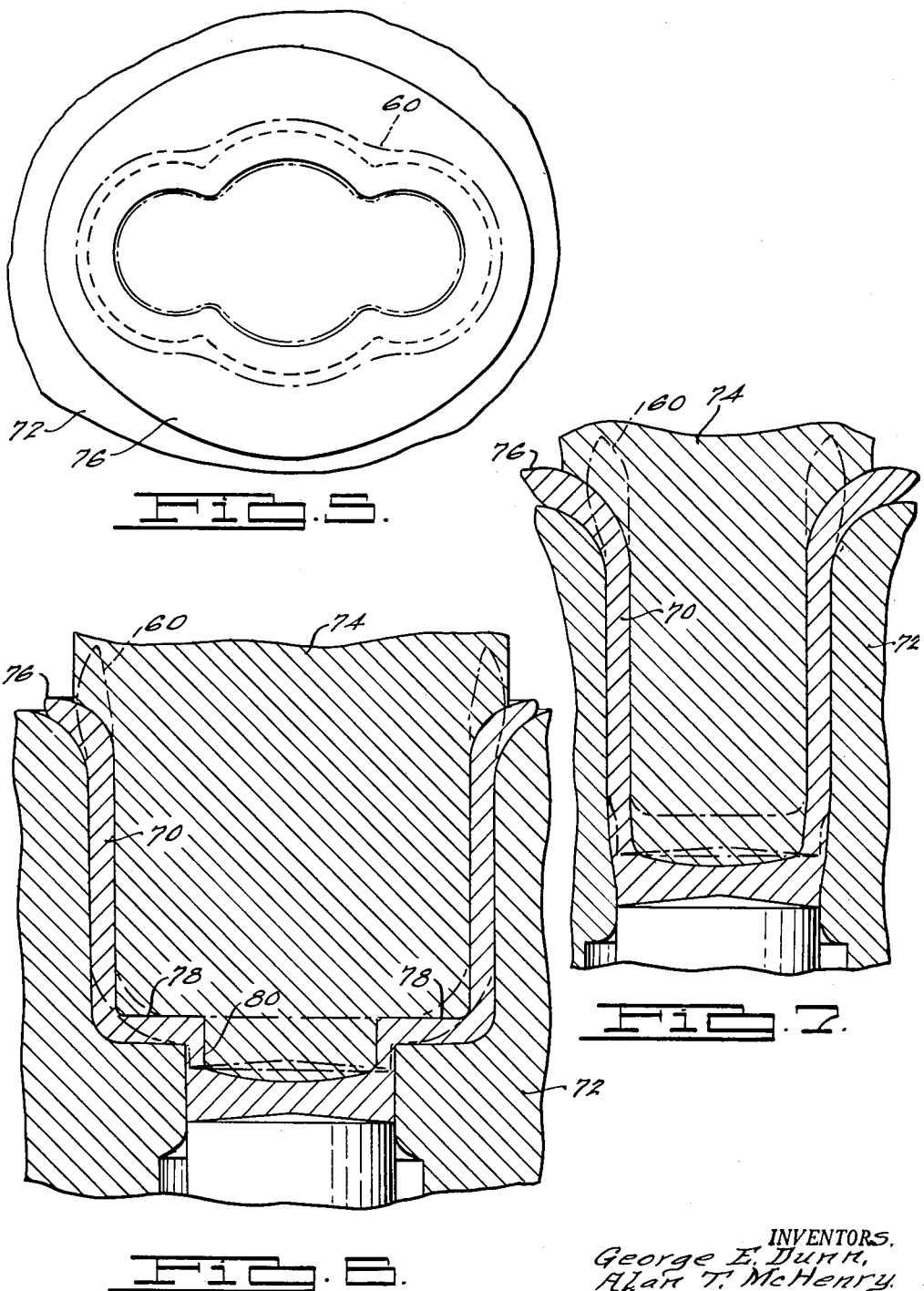
INVENTORS.
George E. Dunn,
Alan T. McHenry.
BY
ATTORNEY.

July 24, 1956   G. E. DUNN ET AL   2,755,543
METHOD OF MAKING UNIVERSAL JOINT BODIES
Original Filed Sept. 25, 1952   5 Sheets-Sheet 3
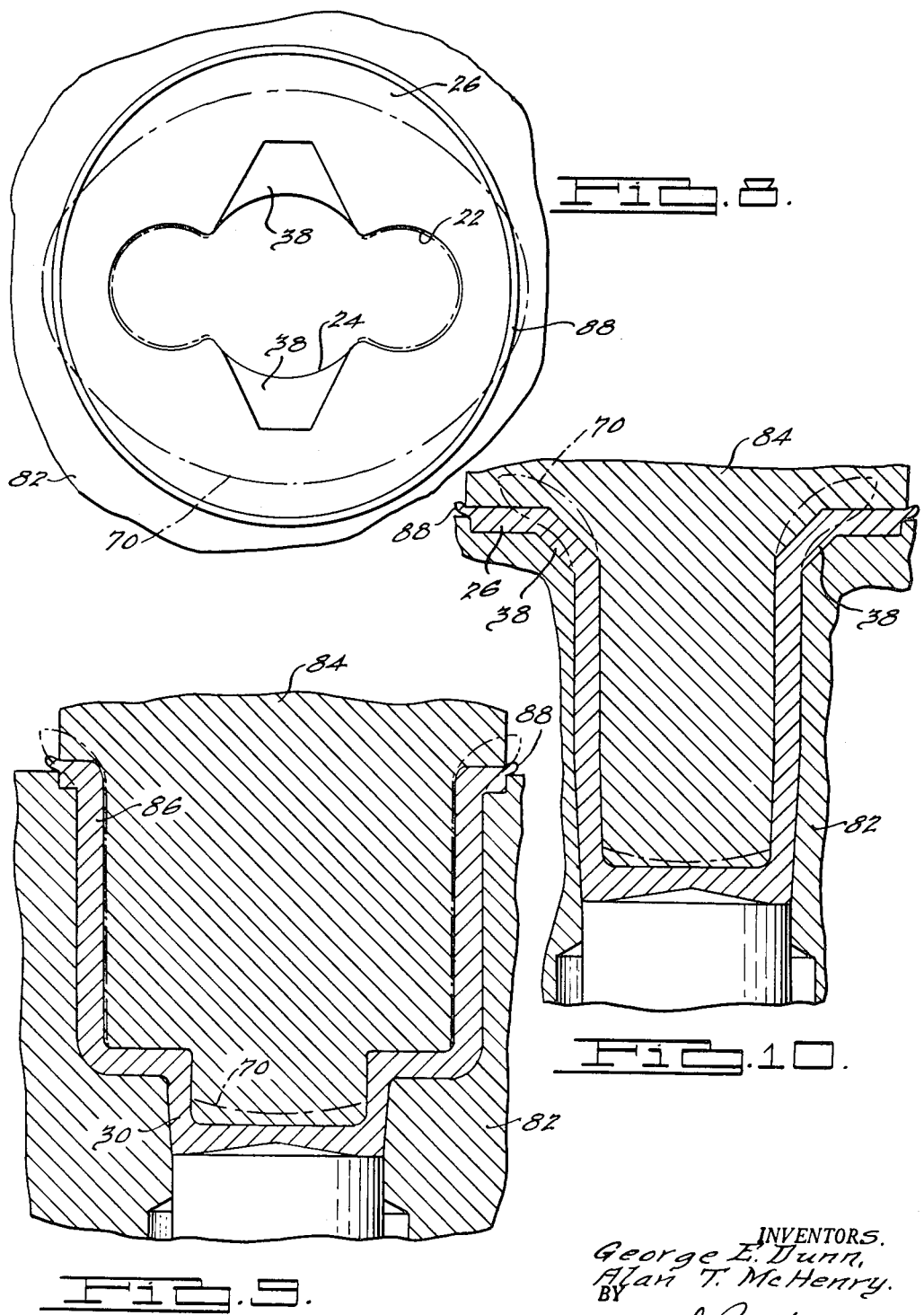
INVENTORS.
George E. Dunn,
Alan T. McHenry.
BY
ATTORNEY.

July 24, 1956 — G. E. DUNN ET AL — 2,755,543
METHOD OF MAKING UNIVERSAL JOINT BODIES
Original Filed Sept. 25, 1952

INVENTORS.
George E. Dunn,
Alan T. McHenry.
BY
ATTORNEY.

United States Patent Office 2,755,543
Patented July 24, 1956

2,755,543

METHOD OF MAKING UNIVERSAL JOINT BODIES

George E. Dunn, Dearborn, and Alan T. McHenry, Grosse Pointe, Mich., assignors, by mesne assignments, to Chrysler Corporation, Detroit, Mich., a corporation of Delaware Original application September 25, 1952, Serial No. 311,504. Divided and this application July 24, 1953, Serial No. 377,582

5 Claims. (Cl. 29—535)

This invention relates to universal joint bodies and to a method of making the same, and has particular reference to a body of the sliding two-trunnion type of joints as disclosed in Warner 1,921,274.

These bodies have opposed and parallel cylindrical guides with a center bore parallel to and between and intersecting the guides, the guides being open at one end of the body and closed at the other end thereof. The body is provided with a radially extending, continuous attaching flange at the open end of the guides and with a neck at the other end defining a continuation of the center bore.

It has been the practice heretofore to make these bodies in either of two ways. According to one method, a blank of sheet stock is subjected to a series of drawing operations to form a stamped body, and while this method has in general proved satisfactory heretofore, such stamped bodies will yield under high torque loads at the intersections between the guides and the center bore. This tendency of such stamped bodies to yield at such intersections causes the joint body to open up, thereby increasing the clearances between the balls and guides, which results in deterioration and premature failure of the joint. This tendency of stamped bodies to open up at such intersections is due to the fact that such intersections are a critical part of the body and joint bodies of this type are now being used at working loads which border closely upon the capacity of the joint body. As it is not feasible for competitive and performance reasons to increase the size of the joint body, the recent advent of cars with greatly increased horsepower and torque has seriously affected further use of joints of this type using stamped bodies, in spite of the many inherent advantages of this type of joint.

Bodies of this type have heretofore also been made from forgings wherein the center bore and guides have been bored out, but the cost of machining required by this method of producing bodies has been such as to preclude its employment on joints made for original equipment purposes, as distinguished from joints made for sale to the repair trade.

According to this invention, a joint body of this type is made by a series of forging operations which are employed to extrude a headed solid metal body so as to form a rough joint body suitable for finish machining operations, the finish machine operations required being substantially the same as those required for a stamped body as heretofore made. This method has a number of advantages. In the first place, a forged body of a given size made according to the invention may be subjected to a maximum working load of about 18,000 in. lbs., whereas a body of the same size made according to the aforesaid stamping process may be employed, say, for working loads up to only about 10,000 in. lbs. Thus, this invention makes it possible to approximately double the capacity of the joint body without increasing the size.

In addition, a forged body made according to this invention employs less metal of a less expensive character than that required for stamped bodies. For example, for a given size, a slug of metal stock required for a body made according to this invention is approximately 2 lb., 4 oz. and the finished body weighs approximately 1 lb., 10½ oz., whereas the same size body made according to the conventional stamping method requires a blank of approximately 3 lb. and the resulting finished body weighs approximately 1 lb. 8 oz. Thus, according to this invention substantially less metal of a less expensive type is required, thereby substantially reducing material costs and scrap losses. The scrap from the previously described forging and machining method now generally used is considerable, since the center bore and the guides must all be bored out, and the metal so removed is all scrap.

In addition to the increase in strength due to the use of a forged body, the method herein disclosed makes it possible to strengthen the body at various critical places, as will be hereinafter pointed out in more detail.

A principal object of the invention, therefore, is to provide a new and improved body for universal joints of the type referred to.

Another object of the invention is to produce a new and improved method of making joint bodies of the type referred to.

Other and further objects of the invention will be apparent from the following description and claims and may be understood by reference to the accompanying drawings, of which there are five sheets, which by way of illustration show a preferred embodiment of the invention and what we now consider to be the best mode in which we have contemplated applying the principles of our invention. Other embodiments of the invention may be used without departing from the scope of the present invention as set forth in the appended claims.

In the drawings:

Fig. 1 is a perspective view of a slug of metal stock useful for making joint bodies according to the method herein disclosed.

Fig. 2 is a fragmentary sectional view through a forging die assembly and showing the first step of the method herein disclosed. In this and in other figures the shape of the metal body which is being formed is shown in dot and dash lines before the operation in question.

Fig. 3 is a plan view of Fig. 2 with the punch removed.

Fig. 4 is a sectional view similar to Fig. 2 but taken at right angles thereto.

Figs. 5, 6 and 7 illustrate the next step in the method, Fig. 5 being a plan view of the partially formed body and the cavity die, Fig. 6 being a vertical sectional view through the same and with the punch die at the bottom of its stroke, and Fig. 7 being another vertical sectional view at right angles to Fig. 6.

Figs. 8, 9 and 10 illustrate the next step in the method, Fig. 8 being a plan view of the partially formed body and the cavity die, Fig. 9 being a vertical sectional view through the same with the punch die at the bottom of its stroke, and Fig. 10 being another vertical sectional view at right angles to Fig. 9.

Figures 13, 14:
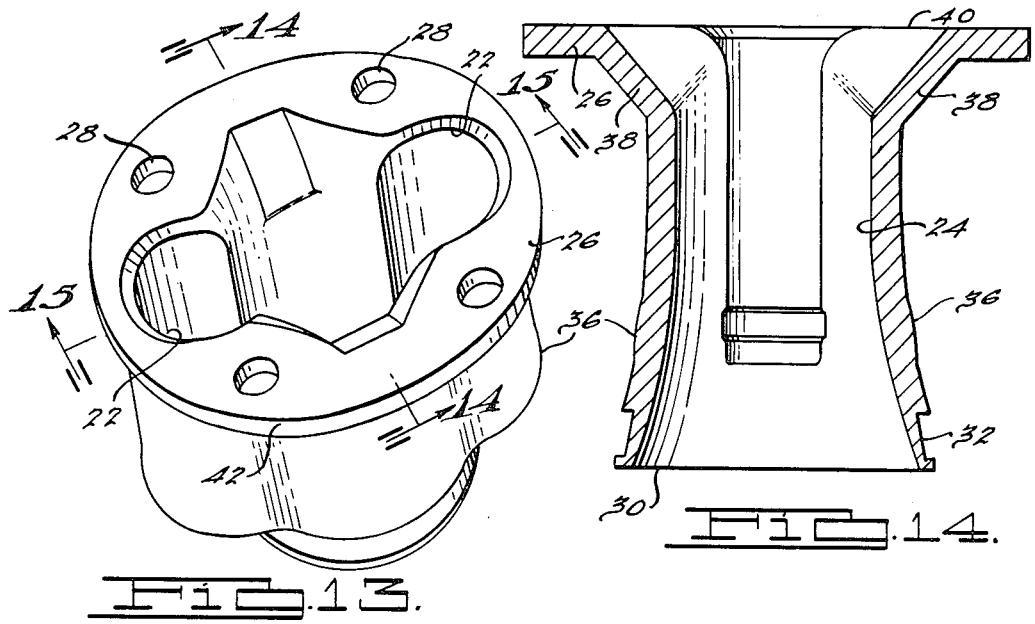
Fig. 13 is a perspective view of a finished joint body.
Figure 15:
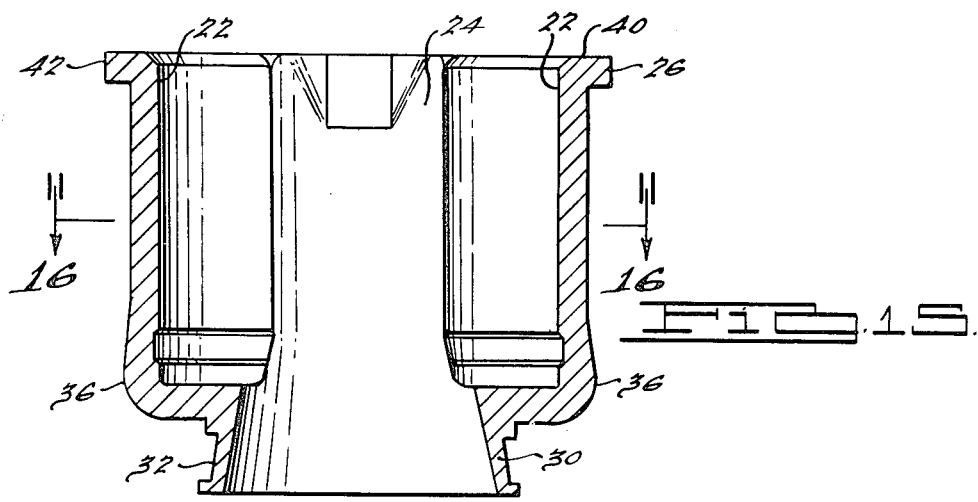

Figs. 14 and 15 are sectional views thereof, taken in planes along the lines 14—14 and 15—15 of Fig. 13.

Figure 16:
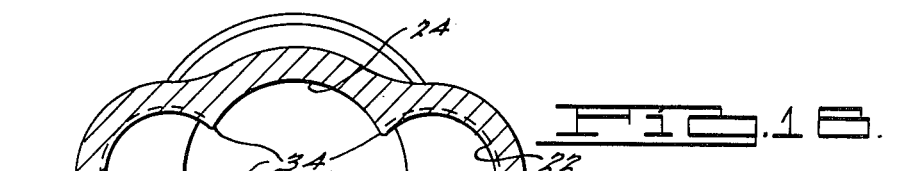

Fig. 16 is a transverse sectional view taken in a plane along the line 16—16 of Fig. 15.

As illustrated in Figs. 13, 14, 15 and 16, a universal joint body embodying the invention consists of a hollow, metal, one-piece body having opposed and parallel cylindrical guides 22 with a center bore 24 parallel to and between and intersecting such guides. The guides 22, sometimes called raceways, are open at one end of the body and closed at the other end thereof. A radially extending, continuous attaching flange 26 is formed at the open end of the guides, the flange being provided with bolt holes 28 to permit the assembly of the body to the companion flange with which it is used. The center bore 24 is open at both ends. A bell mouthed neck 30 defines a continuation of the bore and projects beyond the closed end of the guides and is provided with an annular groove 32 forming a seat for the sealing boot of the joint. Between the flange 26 and the neck 30 the body is substantially oval shaped in transverse section normal to the bore and guides.

The wall thickness of the body is substantially uniform from the open to the closed end of the guides and around the body normal to the guides, except adjacent the intersections 34 of the guides 22 and the center bore 24, and at such intersections the wall thickness is substantially greater so as to reinforce the body along the lines of the intersections. The body is also formed to have an integral external stiffening rib 36 which extends transversely around the body adjacent the closed end of the guides. This rib 36, together with the thicker wall sections at the intersections 34, strengthens and stiffens the body so as to reduce the tendency of the raceways to open up at the intersections between the guides 22 and the center bore 24. The body is also formed to have diametrically opposed stiffening ribs 38 which extend between the flange 26 and the external portions of the center bore 24.

The guides or raceways 22 are finished by machine operations since they form bearing surfaces for the balls and centering buttons, and the guides 22 and the center bore 24 are also case hardened. The face 40 of the flange 26 is provided with a finished surface in a plane normal to the axes of the guides 22 and center bore 24, and in addition the outer rim 42 of the flange is provided with a finished surface concentric with the axis of the center body 24 for accurate nesting of the body in the companion flange.

The preferred method for making such bodies is as follows. A slug 50 of low carbon—10/20—hot rolled steel bar stock of the shape shown in Fig. 1 is heated to a temperature of the order of 2250° to 2300° F., and such slug preferably is preformed so as to have the shape of the body 52 as shown in dot dash lines in Figs. 2, 3 and 4. The preforming operation shortens and bulges the body 50 to produce a body having the shape as indicated at 52, and this operation cracks and removes the scale created during the heating aforesaid. It will also be noted that the preforming operation partially forms one end of the slug 52 as shown in Fig. 2 so as to get a preliminary distribution of the metal.

The slug 52 is then inserted in the cavity 54 of the cavity die 56, as shown in Figs. 2, 3 and 4. The punch die 58 is then driven into the body 52 along the axis thereof as shown in Figs. 2 and 4, thereby extruding the slug 52 into the hollow shape 60 as shown in Figs. 2, 3 and 4, the dies 56 and 58 cooperating to roughly but approximately form the inside and outside shape of the body except for the neck and the flange. However, this operation accumulates a mass of metal 62 which will subsequently be used to form the neck 30, and a mass of metal 64 around the open end of the body which will subsequently be used to form the flange 26. The foregoing and the following forging operations are all carried on in rapid succession while the body is in its highly heated condition. The inner solid line 66 shown in Fig. 3 shows the inside contour of the hollow body 52, the punch die 58 having been removed. The pin 68 is a knockout pin for the die 56.

In the next step, as shown in Figs. 5, 6 and 7, the body 60 as formed in the preceding operation is illustrated in dot dash lines, while the shape of the body 70 after the operations illustrated in Figs. 5, 6 and 7 is shown in solid line and is cross hatched. In the operations shown in Figs. 5, 6 and 7 the cavity die 72 cooperates with the punch die 74 to bell mouth the open end of the body 70 as indicated at 76 and to square the bottom or closed ends of the guides as indicated at 78. The neck is also partially extruded as shown at 80. The dies 72 and 74 are slightly larger in cross section than the dies 56 and 58. This expedites the insertion of the body 60 into the cavity of the die 72 and also results in a slight expansion of the size of the body toward its final shape and size.

In the next operation, as shown in Figs. 8, 9 and 10, the partly formed body 70, shown in dot dash lines, is inserted in the cavity of the cavity die 82, and the cavity die 82 cooperates with the punch die 84 when driven into the body 70 to form the flange 26 and to finish the extrusion of the neck 30 and to bring the outside of the body to its final size and the inside of the body to size for machining. The stiffening ribs 38 are also formed in this step.

Figure 11:
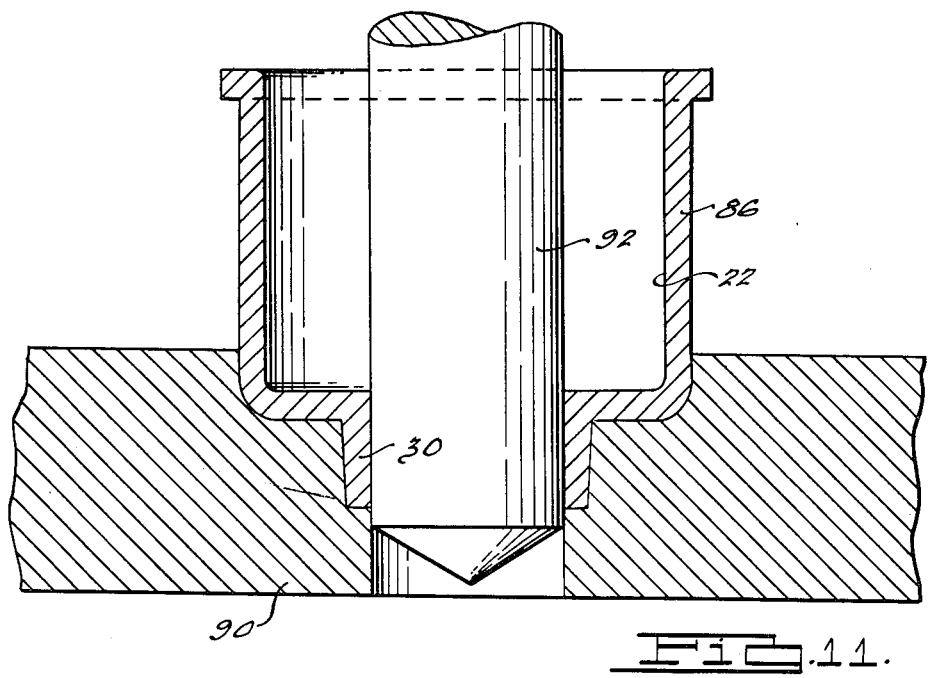
Fig. 11 is a vertical sectional view illustrating the step of piercing the neck of the joint body.
Figure 12:
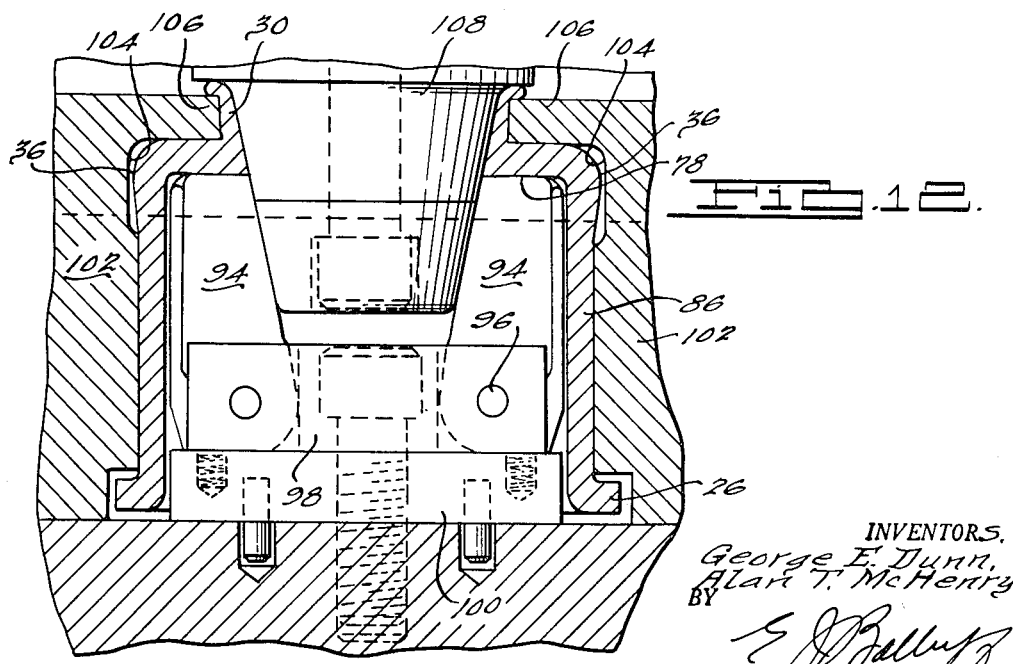
Fig. 12 is a vertical sectional view through the forging dies and a joint body, and illustrating the step of bell mouthing the neck to its final form and the accompanying extrusion of metal to form an external stiffening rib transversely of the body adjacent the closed end of the guides.

After the operation shown in Figs. 8, 9 and 10, the body, now indicated at 86, is inserted in a die (not shown) to trim the flash 88 from the flange 26, and the body 86 is then inserted in a cavity die 90, as shown in Fig. 11. A piercing die 92 is then employed to pierce the neck 30 so as to remove therefrom the transverse section of metal which was left after the operations disclosed in Figs. 8, 9 and 10. Thereafter, the body is assembled in the die means as shown in Fig. 12. In this operation the bottom 78 of the raceways or guides 22 rests upon the upper surface of a pair of pivoted die members 94 pivotally supported at 96 on the cross piece 98 which is bolted to the plate 100. A pair of reciprocable dies 102 is then moved together so as to close around and engage the outer surface of the body 86 as shown, it being observed that the dies 102 are provided with relief grooves 104 which extend all the way around the body 86 at the closed ends of the guides. The dies 102 are provided with portions 106 which cooperate with the punch die 108 to bell mouth the neck 30 to its final form, the punch die 108 upon being driven into the neck 30 expanding the same to its final form and also engaging and expanding the pivoted die members 94 so as to extrude metal into the relief grooves 104 to form the rib 36. The die members 94 support the body 86 during this operation and maintain the shape of the inner surface of the guides 22 and force the metal displaced by the penetration of the die member 108 into the neck into the groove 104. It is understood that the die members 102 come together at their side edges, the die members 102 forming in effect a split die so as to permit removal of the body 86 after the formation of the rib 36 and the neck 30.

While we have illustrated a series of steps with certain forming operations being carried on in each step, we contemplate that the number of steps might be reduced by combining certain of the operations so that a lesser number of operations would be required to form the slug 50 into a body of the desired shape.

After removal from the dies, as shown in Fig. 12, the body is ready for the machining operations, and since these operations are the same as those employed for machining stamped bodies, there is no necessity of setting forth the same here.

It should be pointed out that the method herein disclosed makes it possible to provide thicker wall sections along the intersections 34, whereas in the method employed for producing stamped bodies the contour of the outer wall follows that of the inner wall, with the result that in stamped bodies the intersections between the guides and the center bores are a critical part of the joint body.

It should also be noted, as shown in Figs. 14 and 15, that the wall thickness of the body is substantially uniform from one end to the other, whereas with stamped bodies the wall thickness tapers with the depth of the draw. For example, in a stamped joint body of a given size, the wall thickness at the open end of the guides is 7/32 in., whereas at the closed end of the guides it is tapered down to 3/16 in. This cannot be avoided in drawing operations. According to the method herein disclosed, not only are the wall thicknesses substantially uniform from one end of the guides to the other, but also the method herein disclosed makes it possible to form the stiffening rib 36 around the body at the closed end of the guides which cooperates with the thickened sections along the intersections 34 to greatly increase the capacity of the body, as previously indicated.

While we have illustrated and described a preferred embodiment of our invention, it is understood that this is capable of modification and we therefore do not wish to be limited to the precise details set forth but desire to avail ourselves of such changes and alterations as fall within the purview of the following claims.

We claim:

1. The method of forming a hollow, metal, universal joint body having opposed and parallel cylindrical guides with a center bore parallel to and between and intersecting said guides, a radially outwardly extending attaching flange at one end and an axially extending neck at the other end, which comprises positioning a heated solid metal body consisting of a slug of steel bar stock in die means which will determine the outside shape of said body, forcing a series of die punches into said body along the axis thereof while so positioned so as to extrude the metal of the body between said punch and die means thereby to roughly but approximately form said guides and center bore and accumulate metal stock around the open end of said body for said flange and metal stock at the other end of said body to form said neck; to square the closed end of said guides; to form said radially extending attaching flange; to bring the outside of the body to its finished size and the inside thereof to size for finish machining operations and to form a neck on one end of said body; trimming said flange to size and piercing said neck so as to remove metal therefrom which extends transversely thereof; forcing a die into said neck so as to bring the same to its finished size and to cause the metal of said body in the plane transversely of said guides at the closed end thereof to flow so as to form an external stiffening rib which extends transversely of the body adjacent the closed end of the guides.

2. The method of forming a hollow, metal, universal joint body having opposed and parallel cylindrical guides with a center bore parallel to and between and intersecting said guides, a radially outwardly extending attaching flange at one end and a bell mouthed axially extending neck at the other end, which comprises positioning a heated solid metal body consisting of a slug of steel bar stock in die means which will determine the outside shape of said body, forcing a series of die punches into said body along the axis thereof while so positioned so as to extrude the metal of the body between said punch and die means thereby to roughly but approximately form said guides and center bore and accumulate metal stock around the open end of said body for a flange and metal stock at the other end of said body to form a neck; to square the closed end of said guides; to form a flange; to bring the outside of the body to its finished size and the inside thereof to size for finish machining operations and to form a neck on one end of said body; and trimming said flange to size and piercing said neck so as to remove metal therefrom which extends transversely thereof.

3. The method of forming a hollow, metal, universal joint body having opposed and parallel cylindrical guides open at one end with a center bore parallel to and between and intersecting said guides, an attaching flange at the open end of said guides and an axially extending neck at the other end defining a continuation of said bore, which comprises subjecting a heated solid metal body consisting of a slug of a steel bar stock to a series of extrusion operations by and between a series of male and female dies so as to extrude the metal of said body to form metal walls of substantially uniform thickness defining the inside and outside shape of said guides and center bore, and relatively thick metal walls at the intersections of said bore and guides, a radially extending attaching flange at one end of said guides, and a neck defining a continuation of said bore and projecting beyond the other end of said guides.

4. That method according to claim 3 which includes the step of expanding the interior of said body transversely of the closed end of said guides to form an integral external stiffening rib around said body.

5. The method of forming a hollow, metal, universal joint body having opposed and parallel cylindrical guides with a center bore parallel to and between and intersecting said guides, an attaching flange at one end and a bell mouthed neck at the other end defining a continuation of said bore, which comprises subjecting a heated solid metal body consisting of a slug of steel bar stock to a series of extrusion operations by and between a series of male and female dies so as to extrude the metal of said body to form metal walls defining the inside and outside shape of said guides and center bore, a radially extending attaching flange at one end of said guides, and a neck defining a continuation of said bore and projecting beyond the other end of said guides.

References Cited in the file of this patent

UNITED STATES PATENTS

| | | |
|---|---|---|
| 1,024,840 | Erhardt | Apr. 30, 1912 |
| 1,824,810 | Ford | Sept. 29, 1931 |
| 1,877,342 | Malby | Sept. 13, 1932 |
| 1,881,877 | Nickelsen | Oct. 11, 1932 |
| 2,028,996 | Sautier | Jan. 28, 1936 |
| 2,321,085 | Hubbard | June 8, 1943 |
| 2,344,803 | Criley | Mar. 21, 1944 |
| 2,371,716 | Snell | Mar. 20, 1945 |